United States Patent [19]

Klein et al.

[11] Patent Number: 4,539,827
[45] Date of Patent: Sep. 10, 1985

[54] BELT WASHING IMPROVEMENTS

[75] Inventors: Edward P. Klein, Covington, Va.; Alfred H. Nissan, Scarsdale, N.Y.

[73] Assignee: Westvaco Corporation, New York, N.Y.

[21] Appl. No.: 583,642

[22] Filed: Feb. 27, 1984

Related U.S. Application Data

[62] Division of Ser. No. 474,691, Mar. 11, 1983, abandoned.

[51] Int. Cl.³ .................... B01D 35/20; D21C 9/02; B08B 3/12

[52] U.S. Cl. .................. 68/3 SS; 68/205 R; 162/60; 162/192; 162/209; 162/310; 210/195.1; 210/196; 210/216; 210/384; 210/388; 210/401

[58] Field of Search ............. 210/783, 772, 216, 386, 210/400, 401, 406, 188, 195.1, 196, 197, 384, 383, 388; 162/60, 275, 277, 278, 50, 192, 209, 355, 310, 380; 8/156, 158; 68/181 R, 3 SS, 205 R

[56] References Cited

U.S. PATENT DOCUMENTS

| | | | |
|---|---|---|---|
| 2,360,779 | 10/1944 | Lang | 162/55 |
| 3,025,213 | 3/1962 | Copeland | 162/60 |
| 3,077,990 | 2/1963 | Peterson | 210/401 |
| 3,161,522 | 12/1964 | Compton | 210/400 |
| 3,258,391 | 6/1966 | Cornell | 162/30 |
| 3,426,908 | 2/1969 | Davis | 210/401 |
| 3,454,970 | 7/1969 | Sutherland | 8/156 |
| 3,575,850 | 4/1971 | Davidson | 210/401 |
| 3,601,039 | 8/1971 | Schover | 210/400 |
| 3,910,815 | 10/1975 | Shelor | 162/277 |
| 3,939,077 | 2/1976 | Seibert | 210/401 |
| 3,943,233 | 3/1976 | Swanson | 210/401 |
| 3,966,610 | 6/1976 | Gibbs | 210/400 |
| 4,046,621 | 9/1977 | Sexton | 162/40 |
| 4,137,159 | 1/1979 | Sawyer | 210/384 |
| 4,154,644 | 5/1979 | Ericsson | 162/60 |
| 4,270,978 | 6/1981 | Fioravanti | 162/275 |
| 4,297,164 | 10/1981 | Lee | 162/60 |
| 4,350,597 | 9/1982 | Selm | 210/772 |
| 4,505,137 | 3/1985 | Klein | 68/62 |

OTHER PUBLICATIONS

TAPPI, vol. 62, No. 9, Sep. 1979, p. 75, Lee, "Optimizing the Displacement Washing of Pads of Wood Pulp Fibers".
Svensk Papperstidn, No. 4, 1976, p. 123, Grahs, L. E., "Displacement Washing of Packed Beds of Cellulose Fibers".
TAPPI, vol. 59, No. 6, Jun. 1976, p. 140, Gullichsen, J., and Ostman, "Sorptin and Diffusion Phenomena in Pulp Washing".
TAPPI, vol. 58, No. 9, Sep. 1975, p. 156, Rosen, "Adsorption of Sodium Ions on Kraft Pulp Fibers During Washing".
Pulp and Paper Magazine of Canada, 74(10): T329, Oct. 1973, Norden, H. V., Pohjola and Seppanen, Statistical Analysis of Pulp Washing on an Industrial Rotary Drum.
Paper Trade Journal, Feb. 24, 1969, p. 30, Perkins, J. K., How to Improve Kraft Brown Stock Washing Efficiency.
Papper och Tra, No. 6, 1968, p. 347, Kommonen, F., "Pulp Washing Evaluation for Design and Operation".
TAPPI, vol. 49, No. 2, Feb. 1966, p. 75, Pellett, G. L., Longitudinal Dispersion, Intra Particle Diffusion, and Liquid-Phase Mass Transfer During Flow Through Multiparticle Systems.
TAPPI, vol. 45, No. 4, Apr. 1962, p. 296, Meyer, H., A Filtration Theory for Compressible Fibrous Beds Formed from Dilute Suspensions.
TAPPI, vol. 37, No. 3, Mar. 1954, p. 83, Perkins, J. K., Welsh and Mappus, "Brown Stock Washing Efficiency: Displacement Ratio Method of Determination.

Primary Examiner—Ernest G. Therkorn
Attorney, Agent, or Firm—W. A. Marcontell; R. L. Schmalz

[57] ABSTRACT

The washing efficiency of removal of cooking and bleaching chemicals from cellulose paper pulp on horizontal belt washing filters is improved by disrupting the filter mat adjacent the belt intermediately of soft, displacement wash liquor applications to the filter mat topside. The objective may be achieved by directing a line of low volume, high pressure jets of filtrate or wash liquor against the belt underside. Alternatively, sonicly vibrated foils extended transversely of and adjacent to the belt are effective to disrupt the filler mat pursuant to the invention objective.

4 Claims, 5 Drawing Figures

U.S. Patent  Sep. 10, 1985  Sheet 1 of 2  4,539,827
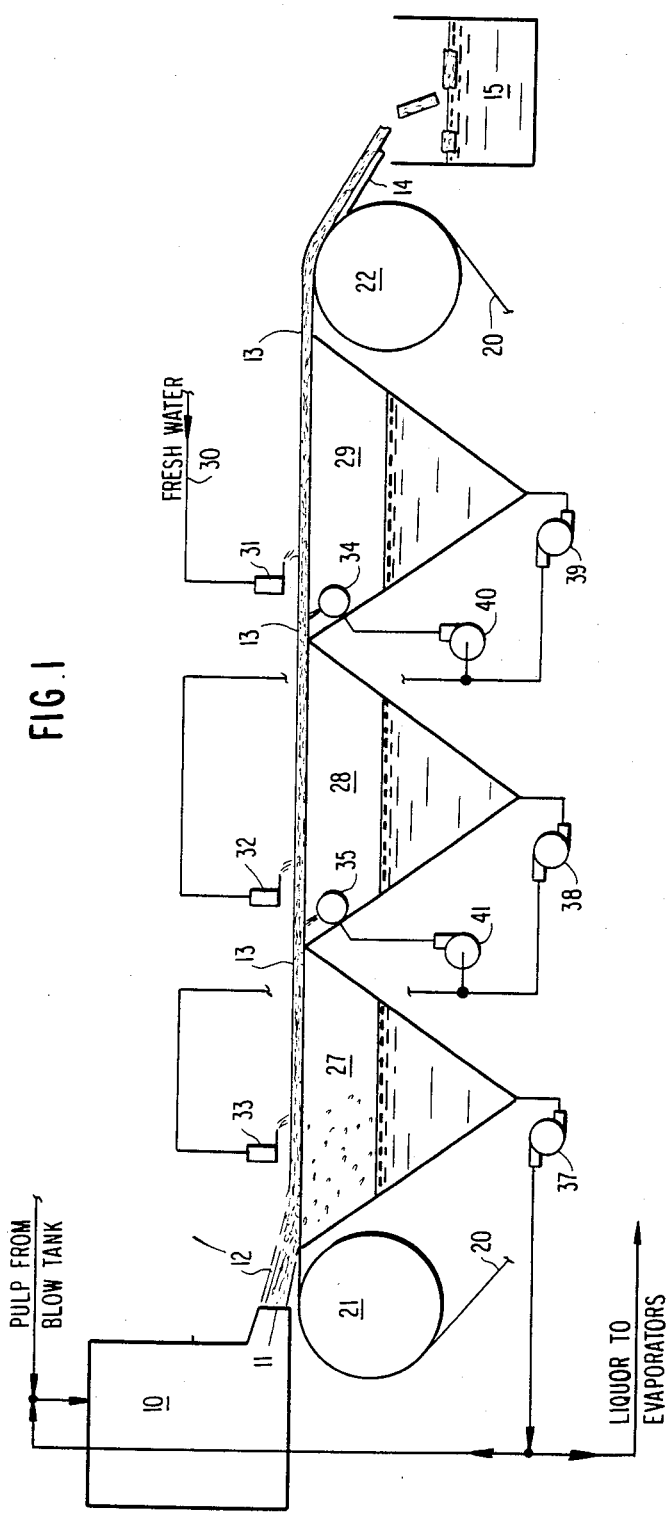
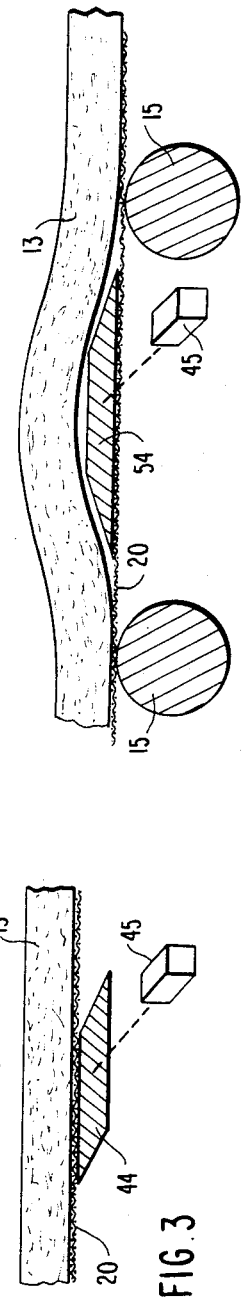

BELT WASHING IMPROVEMENTS

This is a division of application Ser. No. 474,691, filed Mar. 11, 1983, now abandoned.

BACKGROUND OF THE INVENTION

1. Field of the Invention

The present invention relates to the preparation of cellulose fiber pulp from wood and other cellulosic materials. More particularly, the present invention relates to the flushing or washing of lignin, digestion and bleaching chemicals from cellulosic pulp.

2. Description of the Prior Art

Raw wood, bagasse and other cellulosic fiber sources are delignified by cooking processes in the presence of chemicals which form water soluble compounds and complexes with the natural lignin binder of the raw fiber matrix. Although the chemicals used in the digestive cooking process are relatively inexpensive, those quantities consumed in the 1500 tons of dry pulp per day production of an average pulp mill necessitate an economical recovery and recycle of such chemical values. Moreover, the lignin compounds which must be removed from the cellulose fiber matrix contain sufficient heat value and volatility to contribute favorably to the over-all mill heat balance.

The objectives of chemical and heat value recovery from wood cooking liquors are gained simultaneously in a pulp mill recovery furnace. Chemically hydrolyzed lignin, called black liquor, is water flushed from the pulp on a filter surface which permits the liquor and water to drain from the pulp while the fibers are supported and retained on the filter.

As washed from the pulp, black liquor contains approximately 10% to 20% solids in solution and suspension with water. To recover the heat and chemical values present in black liquor, the solids concentration of the solution must be increased to approximately 60%: sufficient to fuel a sustained combustion. This is normally accomplished by evaporation. The 60% solids heavy black liquor is burned in the recovery furnace to release both inorganic chemical values combined therewith and heat to generate steam. A portion of such liquor generated steam is used in a continuous evaporation flow stream for black liquor concentration with the remainder used in support of other mill processes such as paper drying.

This interrelated chemical recovery process is economically dependent on the balance between heat value and water in the black liquor flow stream. Excess water in the liquor stream adds to the heat demand for liquor evaporation thereby reducing the quantity of heat available from lignin fuel to support other mill processes. Such other mill processes must consequently be supported by purchased, supplemental fuels thereby adding dramatically to the over-all mill energy costs.

The usual source of such excess liquor water is at the pulp washers, the first objective of most pulp mills being a clean pulp. Excess lignin remaining in the pulp beyond the washers adds to the bleaching chemical costs or finally, in unacceptable paper quality.

From the foregoing, it should be appreciated that pulp washing efficiency is pivotal to the favorable economics of a pulp mill.

The currently predominate pulp washing technique includes the use of two to seven rotary drum vacuum filters such as described by U.S. Pat. Nos. 3,363,744; 3,403,786; 3,409,139 and 4,138,313. Pursuant to this practice, a slowly rotating drum filter is partially submerged in a mixing vat containing a 1% to 3% consistency slurry of pulp. A partially evacuated drum interior draws the slurry against the submerged, filter screen surface of the drum. Pulp fibers are retained on the screen surface while a portion of the water contained in the pulp passes therethrough. Such fiber accumulation on the drum screen surface builds a fiber mat thereon until drum rotation carries the mat above the mixing vat slurry surface. In an arcuate increment between emergence from the vat surface and reentry into the respective wash stage vat, the mat is peeled from the drum surface and directed into the vat of the subsequent wash stage where the process is repeated.

An alternative pulp washing technique in minority usage relies upon an endless horizontal belt filter similar to a fourdrinier papermaking screen. U.S. Pat. Nos. 4,154,644; 4,046,621; 3,939,077; 3,454,970 and 3,426,908 include representative descriptions of horizontal belt washers. The slurried pulp is deposited in a continuous flow stream onto the traveling belt topside which retains and supports the fiber mat residue of pulp fiber. On the underside of the top run of the belt is provided one or more vacuum pits to generate an atmospheric pressure differential across the belt and the mat deposited thereon.

Both drum washing and belt washing techniques rely upon a plurality of wash stages wherein the fiber is flushed with wash liquor and drained in each stage. As the pulp washing sequence advances from the first to last stage, filtrate drawn from the pulp advances counterflow of the pulp so that the filtrate of each stage is used to wash the preceding stage pulp mat.

In theory, plug flow displacement of mat liquor with more dilute wash liquor provides the least mixing of the respective liquors and the greatest wash efficiency. If ideal plug flow was attainable in all wash stages, no more fresh water would be added to the last stage than is discharged with the pulp from the last stage. Unfortunately, the ideal is not attainable in practice due to the fact that the fibrous mat is neither homogeneously permeable nor porous. Mat liquor contained within the interstitial matrix between the fibers is not uniformly available to wash liquor displacement. Accordingly, the available wash liquor passes through the mat along a dispersed system of channels and interconnected large pores. These channels and interconnected large pores are flushed of mat liquor but relatively large quantities of additional liquor trapped in closed or restricted pores remains to be carried over into the next wash stage.

From the foregoing understanding of mat washing mechanics, a staged series of drum washers has an inherent efficiency advantage over the same number of stages in a single belt washer due to reslurrying of the fiber and mat reformation respective to each drum stage. For each drum wash stage, a new mat is formed along with a new set of flow channels respective to each new mat. Similarly, each time the pulp is reslurried, liquor trapped in the closed pores of the previous mat is released and diluted. Conversely, the capital cost of each stage of drum washing equipment is considerably greater than the per stage cost of belt washing equipment.

It is, therefore, an objective of the present invention to provide a method and apparatus for improving the washing efficiency of pulp on belt filters over that previously attainable by the prior art.

Another object of the present invention is to improve the washing efficiency of a belt washing unit by improving the efficiency of each washer stage along the belt run.

Another object of the present invention is to increase the percentage of interstitial mat liquor present in a belt filter mat that is available to wash liquor displacement.

Another object of the present invention is to teach a wash liquor application sequence that removes a greater percentage of interstitial liquor present in a belted filter mat with no more than a prior art quantity of wash liquor.

SUMMARY OF THE INVENTION

These and other objects of the invention are accomplished by a low volume portion of the mat filtrate drawn by each vacuum pit along the belt washing process line pumped at high pressure to provide a line of high energy fluid jets impinging against the underside of the filter belt top run.

As the pulp mat forms along the top surface of a belted filter, wash liquor is gently applied to the mat surface top at locations corresponding to the several vacuum chambers beneath the filter belt. To the belt underside is applied the low volume, high pressure jets of filtrate for the purpose of disrupting the pulp mat at the filter belt interface and opening previously closed pore and displacement channels within the mat pore matrix.

BRIEF DESCRIPTION OF THE DRAWING

Relative to the drawings wherein like reference characters designate like or similar elements throughout the several figures of the drawings:

FIG. 1 illustrates the flow schematic of a three stage belt washer for brown stock paper pulp.

FIG. 3 shows a first alternative mat disruption means for the belt washer of FIG. 1.

FIG. 4 shows a second alternative mat disruption means for the belt washer of FIG. 1.

DESCRIPTION OF THE PREFERRED EMBODIMENT

Figure 2:
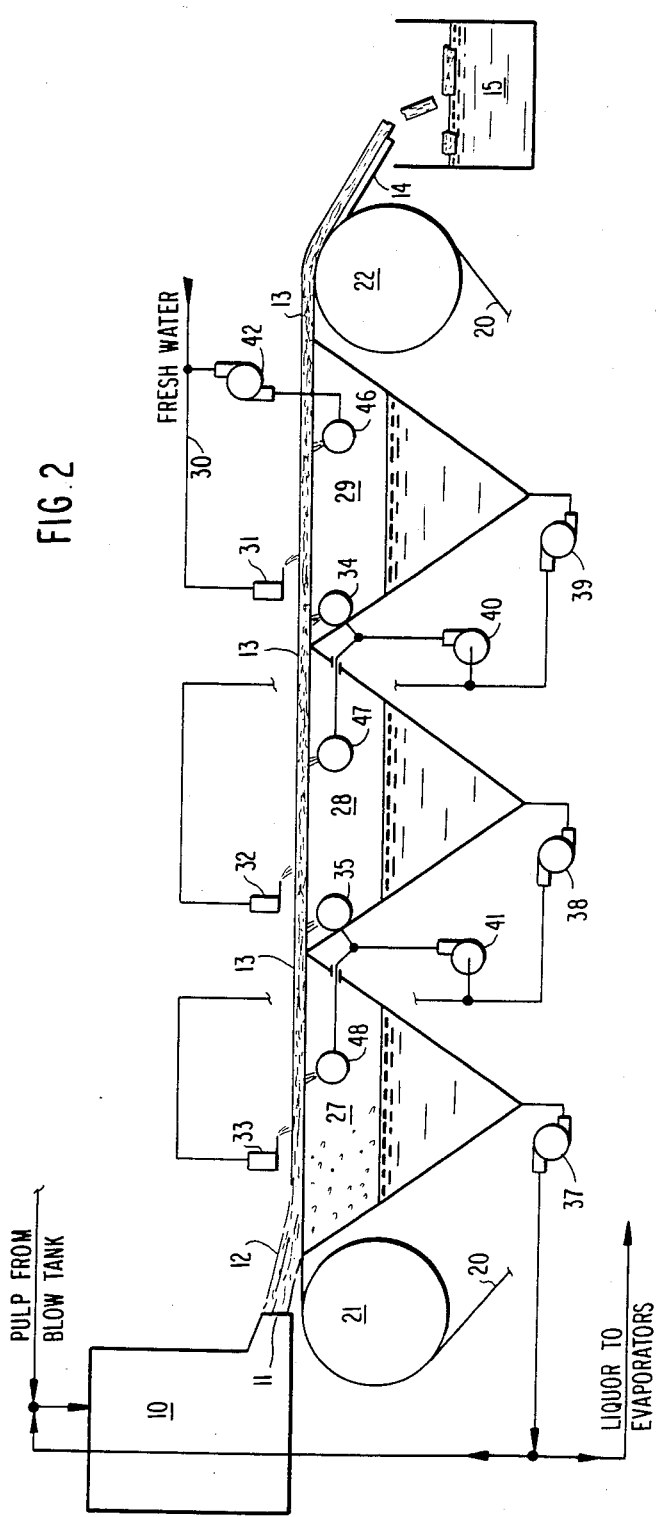
FIG. 2 illustrates a more complex and efficient embodiment of the three stage belt washing system of FIG. 1.

The representative belt washing system schematically illustrated by FIG. 1 includes a headbox 10 dispensing vessel having a slice opening 11 from which a jet of pulp slurry 12 issues upon the horizontal top run of a closed loop filter belt 20 which courses between two breast rolls 21 and 22. Along the horizontal top run of the belt 20 between the two breast rolls 21 and 22, the weight of the belt 20 and pulp mat 13 deposited thereon is carried by a multiplicity of small diameter carrier rolls not shown. Also along the horizontal belt run between the breast rolls 21 and 22 are provided a plurality of vacuum chambers 27, 28 and 29 disposed for drawing a pressure differential across the mat 13 and belt 20 face. The boundaries of each vacuum chamber define a respective wash stage with chamber 27 being the first wash stage, chamber 28 being the second stage and chamber 29 being the third wash stage.

At the finish end of the horizontal belt run, the washed pulp mat 13 is scraped from the belt 20 surface by a doctor board 14 and deposited in a repulping tank 15 where it is reslurried for pumped transfer to further process steps such as bleaching.

The wash liquor component of the overall system runs counter flow to the pulp running direction and enters by conduit 30 delivery of fresh or low solids water as wash liquor makeup to the third wash stage weir box 31. The weir box 31 distributes the wash liquor flow transversely across the belt run for uniform, gentle fall or spray application onto the pulp mat 13 as it passes under the weir box 31.

Wash liquor drawn as filtrate through the pulp mat 13 between the boundaries of third stage vacuum chamber 29 is accumulated at the chamber bottom to be cycled forward by the third stage low pressure liquor pump 39 for delivery to the second stage weir box 32.

As in the third stage, the filtrate of wash liquor from the second stage weir box 32 is accumulated at the bottom of vacuum chamber 28 and cycled forward by the second stage low pressure liquor pump 38 for delivery to the first stage weir box 33.

Filtrate accumulated by the first stage vacuum chamber 27 is cycled forward by the first stage low pressure liquor pump for divided delivery to the concentrating evaporators and to the brown stock line from the deknotting screens or digester blow tanks for stock dilution in the headbox 10.

In the basic embodiment of the invention represented by FIG. 1, high pressure spray manifolds 34 and 35 are disposed under the filter belt 20 within the confines of vacuum chambers 29 and 28, respectively, for delivery of a low volume, high pressure quantity of filtrate to the belt underside with such force and energy as to dislodge fiber obstructions washed into the belt 20 filter openings and to disrupt the lower portion of the mat 13 fiber consolidation. Such low volume, high pressure wash liquor flow is provided by pumps 40 and 41 respective to the manifolds 34 and 35.

A more complex embodiment of the invention is represented by FIG. 2 wherein a line of high pressure jets from manifolds 46, 47 and 48 respective to vacuum chambers 29, 28 and 27 are provided to impinge high pressure jet sprays of wash liquor against the belt 20 underside along the latter half of a vacuum chamber boundary.

Where the primary objective of filtrate sprays 34, 35 and 36 is to clear the belt 20 of screen plugging fiber accumulations, the prime objective of wash liquor sprays 46, 47 and 48 is to thrust past the screen 20 for mat 13 matrix disruption. Accordingly, the same solids concentration of wash liquor is used for mat disruption showers 46, 47 and 48 as is applied gently by weir boxes 31, 32 and 33; the noted difference being the pressure of belt impact. Although high pressure pumps 40 and 41 may be used to supply shower manifolds 34 and 35, the initial wash liquor in line 30 must be high pressurized by final stage pump 42.

Also in the FIG. 2 embodiment it should be understood that high pressure sprays 46,47, and 48 apply no additional washer liquor to the mat beyond that which would have been supplied entirely by weir boxes 31, 32 and 33.

Another embodiment of the invention, illustrated by FIG. 3, provides a sonic vibration bar 44 coupled to a sonic generator 45 in lieu of the low volume, high pressure sprays. The vibration bar 44 may be contained in the shape of a drainage foil and positioned in coupled contact with the belt 20 which is drawn thereover. High frequency oscillation of the bar 44 mechanically provides a pulp mat disturbance for rearrangement of the mat pore matrix prior to deposit of the following quantity of wash liquor.

In the invention embodiment shown by FIG. 4, a sonic vibration bar 54 coupled to a sonic generator 45 is given a faired sectional shape and positioned above the belt 20 between two carrier rolls 15 for knifing between the belt 20 and the mat 13 carried thereby. This arrangement provides the mat 13 with a directly coupled sonic disturbance as it is drawn over the bar 54.

Heretofore described has been the procedural and apparatus essence of the invention. To describe the effectiveness of the invention, it is necessary to develop definitions of mat washing parameters for comparison.

The fraction of mat liquor removed on a vacuum filter by a gently applied top application of wash liquor is expressed as the Displacement Ratio (DR). This expression was developed by Perkins, Welsh and Mappus and published in the organ of the Technical Association of Pulp and Paper Industries, TAPPI, 37 (3): 83 (1954).

Definitively, the DR is the achieved reduction in dissolved solids (black liquor) concentration on a vacuum filter divided by the maximum possible reduction in dissolved solids concentration.

$$DR = (C_o - C_D)/(C_o - C_s)$$

where:
 $C_o$ = concentration of dissolved solids in vacuum filter mixing vat, # dissolved solids/# liquor
 $CD_D$ 31 concentration of dissolved solids in the liquor discharged with the pulp, # dissolved solids/# liquor
 $C_s$ = concentration of dissolved solids in the shower liquor, # dissolved solids/# liquor.

A maximum DR equal to 1.0 would be achieved if all the original liquor held within the intersticies of a vacuum filter mat was displaced by shower liquor. In that case, $C_D$ would equal $C_s$.

In the publication of *Pulp and Paper Magazine of Canada*, 74(10): T329 (1973) H. V. Norden et al described wash liquor consumption as the Wash Liquor Ratio ($\theta$). $\theta$ was defined as the quantity of wash liquor divided by the quantity of liquor discharged with the pulp.

$$\theta = W_s/W_D$$

where:
 $W_s$ = wash liquor flow rate, # liquor/min.
 $W_D$ = quantity of liquor discharged with the pulp, # liquor/min.

Typical Wash Liquor Ratios in the paper pulp industry range from 1 to 2 for brown stock washing and often less for bleach room washing.

An ideal displacement of mat liquor by wash liquor would occur if the wash liquor advanced in a plane through the mat in uniform plug flow expelling the mat liquor before it as filtrate. Consequently, if the plug flow of wash liquor displaced all the initially present mat liquor (DR = 1.0) when the volume of wash liquor applied, $W_s$, equals the volume of residual liquor discharged with the pulp, $W_D$, ($\theta = 1.0$), an ideal case of displacement washing would result.

Unfortunately, even under the best of conditions and equipment, ideal displacement washing cannot be achieved due to the sorption of dissolved substances, dispersion in the direction of flow and slow diffusion of liquor from the fiber lumen and stagnant regions between the fibers. In other words, interstitial characteristics of the mat (i.e., mat formation) bears a strong influence on the efficiency of displacement washing actually achieved.

Poor mat formation is characterized as a collection of pores widely differing in radii and length. Intuitively, wash liquor flows more readily through large diameter, short pores leaving initially present mat liquor behind in small diameter, long pores. Accordingly, washing efficiency is reduced by a mat having a wide mixture of pore sizes due to preferential flow of the wash liquor through the large radius pores: an observation noted by P. F. Lee in U.S. Pat. No. 4,297,164.

To objectively define mat formation quality, a Formation Index (FI) has been developed based on the following assumptions. First, all pores are of equal length. Second, all pores have a radius between $(1-\alpha)$ $R_o$ and $(1+\alpha)$ $R_o$ where $R_o$ is the average pore radius and $0 < \alpha < 1.0$. Finally, there is an equal volume of pores at each radius in the range of radii defined by $\alpha$. Hence, $FI = 1 - \alpha$.

From the relationship $FI = 1 - \alpha$, it will be noted that a uniform distribution of pore sizes (i.e., $\alpha = 0$) gives $FI = 1.0$. A low Formation Index indicates a wide distribution of radii and a poor quality of mat formation from the standpoint of washing efficiency.

The foregoing relationships of Formation Index, Wash Liquor Ratio and Displacement Ratio may be combined in the simplified special case of final wash stage where the influent shower liquor $C_s$ is fresh water containing no dissolved solids and the Displacement Ratio would reduce to $$DR = 1 - \frac{C_D}{C_o}.$$

Such special case relationship provides the useful analytical model of a washer wherein:

$$\frac{C_D}{C_o} = \frac{(3 + \alpha^2)^{0.5}}{4.90\alpha\theta^{0.5}} -$$

$$\frac{(3 + \alpha^2)^{0.5}}{29.4\alpha\theta^{0.5}} - \frac{(1 - \alpha)}{2\alpha} + \frac{(1 - \alpha)^3 \theta}{2\alpha(3 + \alpha^2)} -$$

$$\frac{(3 + \alpha^2)}{24(1 + \alpha)\theta\alpha} + \frac{(3 + \alpha^2)^{0.5} 0.102}{\alpha\theta^{0.5}}$$

Figure 5:
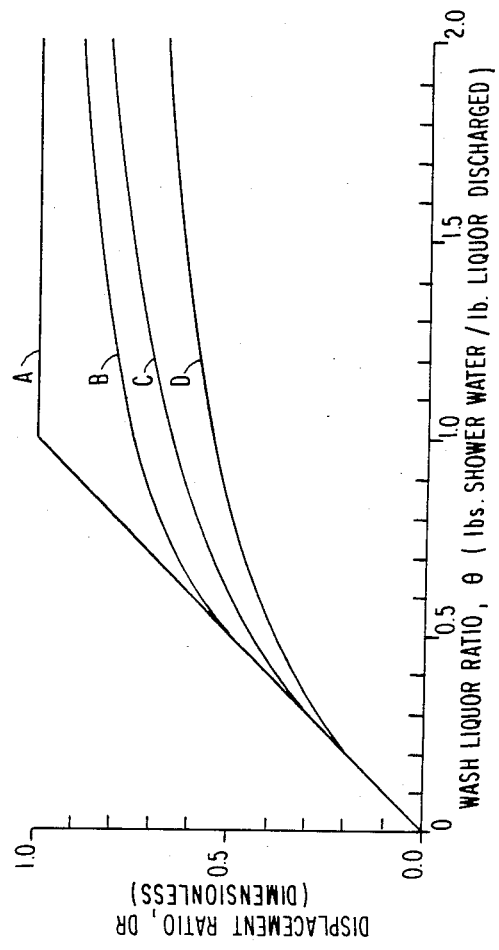
FIG. 5 graphically charts the Displacement Ratio vs Wash Liquor Ratio characteristics of an analytical model by which the present invention is evaluated.

FIG. 5 graphically represents this analytical model wherein curve A describes the ideal plug flow condition and curve B describes the Displacement Ratio vs Wash Liquor Ratio for a mat having a Formation Index of 1.0. Curve C describes the DR vs $\theta$ relationship for a mat having an FI = 0.05 and curve D the same relationship for a mat having an FI = 0.05.

To further demonstrate the effect formation quality, as defined by the Formation Index, has on washing efficiency, the foregoing analytical model will show that a mat having FI = 1.0 flushed with a Wash Liquor Ratio of 2.0 will provide a Displacement Ratio of 0.875. However, if the FI = 0.05, the DR = 0.670. Based on pulp feed and discharge consistencies of 14% and vat consistencies of 2% in each case, the washing yield (% recovery of solid material in feed) in a single stage is 93.3% for a FI = 1.0 and 83.3% for a FI = 0.05. Thus, mat formation quality plays a crucial role in washing efficiency.

Progressively poor formation quality is an inherent design characteristic of the belt washer apparatus concept. Subsequent to initial formation from the headbox 10, the resulting mat is progressively compacted as it advances serially from one wash stage to the other along the belt line. Such compaction increases the degree of channeling of wash liquor through the pulp mat. In addition, fibrous fines are flushed into and block the screen openings of the belt filter thereby diverting the localized pressure differential across the mat at such points of screen blockage.

The invention addresses such progressive compaction and screen blockage by hydraulically or mechanically disturbing a previously formed pore matrix within the mat and dislodging any accumulated blockage of openings in the supporting belt screen.

Although the preferred embodiments of the invention have been described in the context of a vacuum chamber induced pressure differential across the belt carried pulp mat, it will be understood and appreciated by those of ordinary skill in the art that the mat pressure differential may also be induced by positive pressure above the mat. Such positive pressure is provided by the powered induction of atmosphere into the confines of a hooded enclosure which covers the horizontal belt run area.

Having fully described our invention and the preferred embodiments thereof:

We claim:

1. A continuous belt apparatus for drawing and flushing suspension liquor from a slurry comprising liquor and fiber, said apparatus comprising:
   A. an endless belt screen routed for travel in a longitudinal direction over a plurality of liquor receiving vessels distributed along a length portion of said belt, each vessel being defined by a pair of transversely extending compartment boundaries;
   B. means for depositing said slurry onto the topside of said belt screen at one end of said length portion;
   C. means for impressing a pressure differential across said belt screen length portion between said compartment boundaries relative to an atmosphere above said belt supported slurry and said liquor receiving vessels whereby a substantial portion of the fiber suspension liquor constituency of said slurry is induced to drain through said belt screen into said receiving vessels leaving said fiber supported on said belt screen as a loose, wet mat having a first porous matrix of interstitial flow channels formed therein which contain a residual portion of said suspension liquor;
   D. means for softly depositing onto the topside of said mat at a first point between compartment boundaries of a respective vessel, a displacement flow of wash liquor having a solids constituency of lower concentration than that of residual suspension liquor remaining in the flow channels of said mat pore matrix; and,
   E. sonic frequency disturbance means positioned substantially transversely of the belt traveling direction at a second point between compartment boundaries passed by a point on said belt screen prior to said first point for opening previously closed pore and flow channels by rearranging said first pore matrix to form a second pore matrix along the bottom side of said mat adjacent said respective vessel whereby suspension liquor confined in small and obstructed flow channels in said first pore matrix is induced to drain more completely and uniformly.

2. An apparatus as described by claim 1 wherein said sonic frequency disturbance means is provided for each receiving vessel except the first of said plurality.

3. An apparatus as described by claim 1 wherein said sonic frequency disturbance means is positioned between said mat bottom side and said belt screen.

4. A method as described by claim 1 wherein said sonic frequency disturbance means is positioned against the bottom side of said belt screen.

* * * * *

UNITED STATES PATENT OFFICE
CERTIFICATE OF CORRECTION

PATENT NO. : 4,539,827
DATED : September 10, 1985
INVENTOR(S) : E. P. Klein and A. H. Nissan It is certified that error appears in the above-identified patent and that said Letters Patent are hereby corrected as shown below:

Column 5, line 31, delete "$CD_{D31}$" and insert therefor --$C_D$ =--
Column 6, line 56, "0.05" should be --0.5--.

Signed and Sealed this

Seventeenth Day of December 1985

[SEAL]

Attest:

DONALD J. QUIGG

Attesting Officer  Commissioner of Patents and Trademarks

UNITED STATES PATENT OFFICE
CERTIFICATE OF CORRECTION

PATENT NO. : 4,539,827

DATED : September 10, 1985

INVENTOR(S) : E. P. Klein and A. H. Nissan

It is certified that error appears in the above-identified patent and that said Letters Patent are hereby corrected as shown below:

Column 8, line 38 (Claim 4, line 1) delete "method" and insert therefor --apparatus--.

Signed and Sealed this

Twenty-eighth Day of January 1986

[SEAL]

Attest:

DONALD J. QUIGG

*Attesting Officer*   *Commissioner of Patents and Trademarks*